United States Patent
Nedeltchev et al.

(10) Patent No.: US 9,628,379 B2
(45) Date of Patent: Apr. 18, 2017

(54) LARGE SCALE RESIDENTIAL CLOUD BASED APPLICATION CENTRIC INFRASTRUCTURES

(71) Applicant: Cisco Technology, Inc., San Jose, CA (US)

(72) Inventors: Plamen N. Nedeltchev, San Jose, CA (US); Warren Scott Wainner, Sterling, VA (US); John T. Manville, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 137 days.

(21) Appl. No.: 14/726,875

(22) Filed: Jun. 1, 2015

(65) Prior Publication Data
US 2016/0352632 A1   Dec. 1, 2016

(51) Int. Cl.
*H04L 12/723* (2013.01)
*H04L 12/721* (2013.01)
*H04L 12/46* (2006.01)
*H04L 29/06* (2006.01)

(52) U.S. Cl.
CPC ........ *H04L 45/502* (2013.01); *H04L 12/4641* (2013.01); *H04L 45/66* (2013.01); *H04L 69/16* (2013.01); *H04L 69/22* (2013.01)

(58) Field of Classification Search
None
See application file for complete search history.

(56) References Cited

U.S. PATENT DOCUMENTS

| 8,369,333 B2 | 2/2013 | Hao et al. |
| 8,719,804 B2 | 5/2014 | Jain |
| 8,737,395 B2 | 5/2014 | Magee |
| 8,948,054 B2 | 2/2015 | Kreeger et al. |

(Continued)

OTHER PUBLICATIONS

Mahalingam et al., "VXLAN: A Framework for Overlaying Virtualized Layer 2 Networks over Layer 3 Networks, draft-mahalingam-dutt-dcops-vxlan-02.txt", Network Working Group, Internet Draft, Intended Status: Experimental, Aug. 22, 2012, 20 pages.

(Continued)

*Primary Examiner* — Min Jung
(74) *Attorney, Agent, or Firm* — Edell, Shapiro & Finnan, LLC

(57) ABSTRACT

A first customer edge network device receives an encapsulated packet that includes inner headers comprising source address information for a first service running on a first computing apparatus in a first home cloud and destination address information for a second service running on a second computing apparatus in a second home cloud. The customer edge network device inserts a predetermined portion of bits of a virtual domain identifier of the encapsulated packet into a label to form a virtual domain label for label-based routing. The virtual domain label is appended to the encapsulated packet. The encapsulated packet is sent to a first provider edge network device of a provider network. The first provider edge network device appends an virtual private network label to the encapsulated packet, and sends the encapsulated packet to a provider network device for label-based routing in the provider network.

20 Claims, 12 Drawing Sheets

(56) References Cited

U.S. PATENT DOCUMENTS

| | | | |
|---|---|---|---|
| 2012/0110188 A1* | 5/2012 | Van Biljon | G06Q 30/04 709/226 |
| 2014/0122729 A1 | 5/2014 | Hon et al. | |
| 2014/0362859 A1 | 12/2014 | Addanki et al. | |
| 2015/0003463 A1* | 1/2015 | Li | H04L 45/507 370/395.53 |
| 2015/0124805 A1* | 5/2015 | Yadav | H04L 47/50 370/389 |
| 2015/0263886 A1* | 9/2015 | Wang | H04L 41/08 370/254 |
| 2016/0274926 A1* | 9/2016 | Narasimhamurthy | G06F 9/45558 |
| 2016/0285734 A1* | 9/2016 | Dempo | G06F 9/4856 |
| 2016/0323184 A1* | 11/2016 | Li | H04L 49/70 |
| 2016/0337234 A1* | 11/2016 | Duda | H04L 45/74 |
| 2016/0359745 A1* | 12/2016 | Hao | H04L 45/745 |

OTHER PUBLICATIONS

Cisco, "VXLAN Overview: Cisco Nexus 9000 Series Switches", White Paper, Jan. 2015, 10 pages.

\* cited by examiner

800

810 — AT A FIRST VIRTUAL ENDPOINT SERVICE RUNNING ON A FIRST COMPUTING APPARATUS, GENERATING AN ENCAPSULATED PACKET THAT APPENDS TO THE PACKET OUTER HEADERS WHICH COMPRISE LAYER 2 SOURCE ADDRESS INFORMATION FOR THE FIRST VIRTUAL ENDPOINT SERVICE, LAYER 2 DESTINATION ADDRESS INFORMATION FOR A FIRST CUSTOMER EDGE NETWORK DEVICE, LAYER 3 SOURCE ADDRESS INFORMATION FOR THE FIRST VIRTUAL ENDPOINT SERVICE, LAYER 3 DESTINATION ADDRESS INFORMATION FOR A SECOND VIRTUAL ENDPOINT SERVICE RUNNING ON THE SECOND COMPUTING APPARATUS, A VIRTUAL NETWORK IDENTIFIER THAT IDENTIFIES ONE OF A PLURALITY OF LAYER 2 NETWORK SEGMENTS IN WHICH THE SECOND HOME CLOUD RESIDES AND A VIRTUAL DOMAIN IDENTIFIER THAT IDENTIFIES ONE OF A PLURALITY OF LAYER 3 NETWORK SEGMENTS IN WHICH THE SECOND HOME CLOUD RESIDES

820 — SENDING THE ENCAPSULATED PACKET TO THE FIRST CUSTOMER EDGE NETWORK DEVICE

RECEIVING AN ENCAPSULATED PACKET THAT INCLUDES INNER HEADERS COMPRISING SOURCE ADDRESS INFORMATION FOR A FIRST SERVICE RUNNING ON A FIRST COMPUTING APPARATUS IN A FIRST HOME CLOUD AND DESTINATION ADDRESS INFORMATION FOR A SECOND SERVICE RUNNING ON A SECOND COMPUTING APPARATUS IN A SECOND HOME CLOUD, THE ENCAPSULATED PACKET FURTHER INCLUDING OUTER HEADERS WHICH COMPRISE LAYER 2 SOURCE ADDRESS INFORMATION FOR A FIRST VIRTUAL ENDPOINT SERVICE RUNNING ON THE FIRST COMPUTING APPARATUS, LAYER 2 DESTINATION ADDRESS INFORMATION FOR THE FIRST CUSTOMER EDGE NETWORK DEVICE, LAYER 3 SOURCE ADDRESS INFORMATION FOR THE FIRST VIRTUAL ENDPOINT SERVICE, LAYER 3 DESTINATION ADDRESS INFORMATION FOR A SECOND VIRTUAL ENDPOINT SERVICE RUNNING ON THE SECOND COMPUTING APPARATUS, A VIRTUAL NETWORK IDENTIFIER THAT IDENTIFIES ONE OF A PLURALITY OF LAYER 2 NETWORK SEGMENTS IN WHICH THE SECOND HOME CLOUD RESIDES AND A VIRTUAL DOMAIN IDENTIFIER THAT IDENTIFIES ONE OF A PLURALITY OF LAYER 3 NETWORK SEGMENTS IN WHICH THE SECOND HOME CLOUD RESIDES

920

INSERTING A PREDETERMINED PORTION OF BITS OF THE VIRTUAL DOMAIN IDENTIFIER OF THE ENCAPSULATED PACKET INTO A LABEL TO FORM A VIRTUAL DOMAIN LABEL

930

APPENDING THE VIRTUAL DOMAIN LABEL TO THE ENCAPSULATED PACKET

940

SENDING THE ENCAPSULATED PACKET WITH THE VIRTUAL DOMAIN LABEL TO A FIRST PROVIDER EDGE NETWORK DEVICE OF A PROVIDER NETWORK

RECEIVING AT A FIRST PROVIDER EDGE NETWORK DEVICE, AN ENCAPSULATED PACKET FROM A FIRST CUSTOMER EDGE NETWORK DEVICE, THE ENCAPSULATED PACKET INCLUDING INNER HEADERS COMPRISING SOURCE ADDRESS INFORMATION FOR A FIRST SERVICE RUNNING ON A FIRST COMPUTING APPARATUS IN A FIRST HOME CLOUD AND DESTINATION ADDRESS INFORMATION FOR A SECOND SERVICE RUNNING ON A SECOND COMPUTING APPARATUS IN A SECOND HOME CLOUD, THE ENCAPSULATED PACKET FURTHER INCLUDING OUTER HEADERS WHICH COMPRISE LAYER 2 SOURCE ADDRESS INFORMATION FOR A FIRST VIRTUAL ENDPOINT SERVICE RUNNING ON THE FIRST COMPUTING APPARATUS, LAYER 2 DESTINATION ADDRESS INFORMATION FOR THE FIRST CUSTOMER EDGE NETWORK DEVICE, LAYER 3 SOURCE ADDRESS INFORMATION FOR THE FIRST VIRTUAL ENDPOINT SERVICE, LAYER 3 DESTINATION ADDRESS INFORMATION FOR A SECOND VIRTUAL ENDPOINT SERVICE RUNNING ON THE SECOND COMPUTING APPARATUS, A VIRTUAL NETWORK IDENTIFIER THAT IDENTIFIES ONE OF A PLURALITY OF LAYER 2 NETWORK SEGMENTS IN WHICH THE SECOND HOME CLOUD RESIDES AND A VIRTUAL DOMAIN IDENTIFIER THAT IDENTIFIES ONE OF A PLURALITY OF LAYER 3 NETWORK SEGMENTS IN WHICH THE SECOND HOME CLOUD RESIDES, A VIRTUAL DOMAIN LABEL APPENDED TO THE ENCAPSULATED PACKET THAT COMPRISES A PREDETERMINED PORTION OF BITS OF THE VIRTUAL DOMAIN IDENTIFIER

1020

APPENDING VIRTUAL PRIVATE NETWORK LABEL TO THE ENCAPSULATED PACKET

1030

SENDING THE ENCAPSULATED PACKET WITH THE VIRTUAL DOMAIN LABEL AND THE VIRTUAL PRIVATE NETWORK LABEL FROM THE FIRST PROVIDER EDGE NETWORK DEVICE TO A PROVIDER NETWORK DEVICE FOR LABEL-BASED ROUTING IN THE PROVIDER NETWORK

FIG.7

LARGE SCALE RESIDENTIAL CLOUD BASED APPLICATION CENTRIC INFRASTRUCTURES

TECHNICAL FIELD

The present disclosure relates to networking.

BACKGROUND

Single Internet Protocol (IP) subnet home networks are becoming more and more complex, essentially becoming small campus-like networks. The IPv6 Protocol (IPv6) can make these home network partitions (e.g. home security, entertainment, home automation) accessible from the Internet and multiply the number of networks to be addressed. In other words, every home network is becoming a multi-segment, multi-provider, or multi-service network slice.

BRIEF DESCRIPTION OF THE DRAWINGS

FIG. 5 is a flow chart depicting operations performed by a virtual endpoint service running in a home cloud, according to an example embodiment.

FIG. 6 is a flow chart depicting operations performed by a customer edge network device, according to an example embodiment.

FIG. 7 is a flow chart depicting operations performed by a provider edge network device, according to an example embodiment.

DESCRIPTION OF EXAMPLE EMBODIMENTS

Overview

In accordance with one embodiment, a method is provided in which a first customer edge network device receives an encapsulated packet that includes inner headers comprising source address information for a first service running on a first computing apparatus in a first home cloud and destination address information for a second service running on a second computing apparatus in a second home cloud. The encapsulated packet further includes outer headers which comprise Layer 2 source address information for a first virtual endpoint service running on the first computing apparatus, Layer 2 destination address information for the first customer edge network device, Layer 3 source address information for the first virtual endpoint service, Layer 3 destination address information for a second virtual endpoint service running on the second computing apparatus, a virtual network identifier that identifies one of a plurality of Layer 2 network segments in which the second home cloud resides and a virtual domain identifier that identifies one of a plurality of Layer 3 network segments in which the second home cloud resides. The customer edge network device inserts a predetermined portion of bits of the virtual domain identifier of the encapsulated packet into a label to form a virtual domain label for label-based routing. The virtual domain label is appended to the encapsulated packet. The encapsulated packet with the virtual domain label is sent to a first provider edge network device of a provider network.

Example Embodiments

The power of the home network is growing and there is an excess of bandwidth, compute and storage in residential environments to be used for sharing an economy of so-called InterCloud architectures. The opportunity exists to build a home cloud, which is a logical home data center that can be exposed to the Service Providers, Application Providers or both. The InterCloud could be beneficial for end users or prosumers that run these home clouds. They can recover some of the cost of their services, offer services and applications from their home clouds.

Today, a typical Internet Service Provider (ISP) has millions of home users and customers. If it is assumed that there are several service segments per home, it is easy to understand the scalability and performance challenge. No single or simple method or protocol exists that meets the criteria for scale and performance today. It would be useful to have a method and protocols to support a super-cloud (InterCloud) based on multiple small clouds in one-to-one, one-to-many, and many-to-many scenarios.

Figure 1:
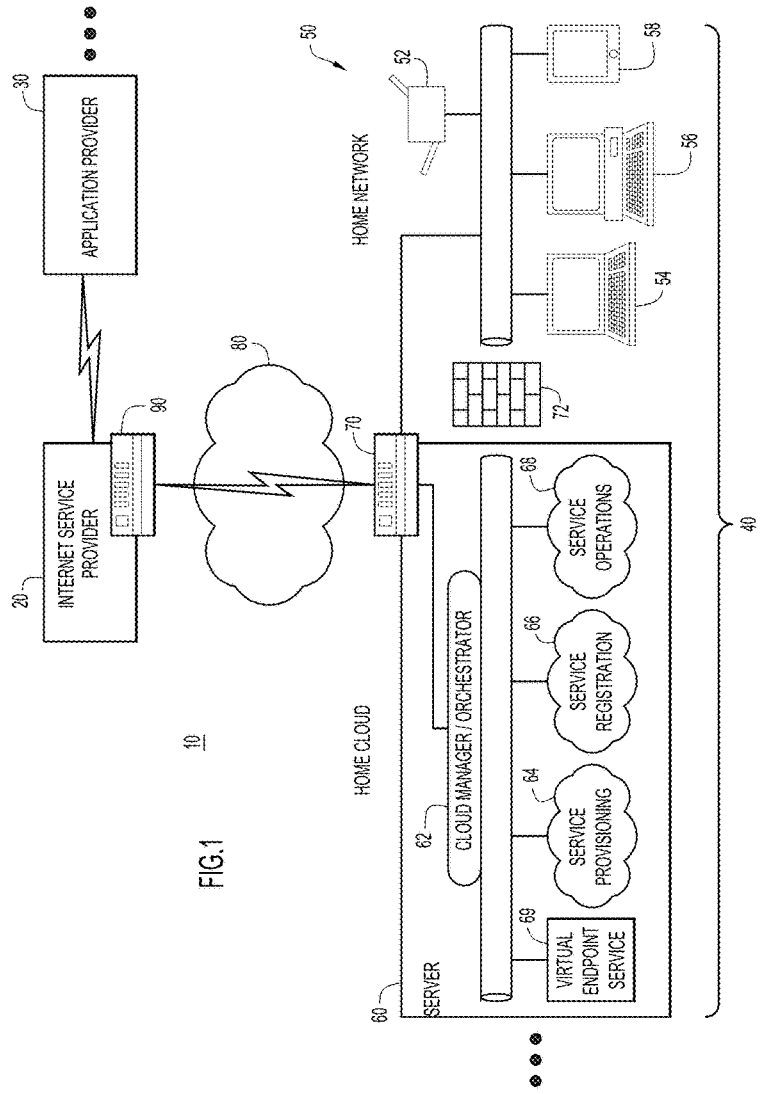
FIG. 1 is a block diagram of a networking environment in which connectivity to services running on a server of a home cloud are enabled into a service provider network in a high-scalable manner, according to an example embodiment.

Reference is first made to FIG. 1. FIG. 1 shows a system 10 that supports an InterCloud based on small clouds (home clouds). The system 10 includes an Internet Service Provider 20, one or more Application Providers 30 and a home/residential network site 40 that includes a home network 50 and a home cloud server 60. The home network site 40 also includes a home gateway/router 70 that connects, by way of a core network 80, to a service provider gateway/router 90. A firewall 72, connected to home gateway/router 70, may also be provided for the home network site.

As will become apparent from the following description, the home gateway/router 70 is referred to as a Customer Edge (CE) router/network device and the service provider gateway/router is referred to as a Provider Edge (PE) router/network device.

As shown in FIG. 1, the home network site 40 is logically partitioned between the home network 50 and the home cloud server 60. The home network 50 includes various equipment typically found in a home network, such as a printer 52, laptop computer 54, desktop computer 56, tablet 58, etc. The home cloud server 60 is a server computer or other similar computing apparatus that includes computing and/or storage resources, some of which may be used by the home network, and the remaining unused resources are to be made available as part of the InterCloud for use by the Internet Service Provider 20 or one or more Application Providers 30. There is software running on the server 60, including cloud manager/orchestration software 62, service provisioning software 64, service registration software 66 and service operations software 68. In addition, running as a separate service, or included as part of one of the other services on the server 60, there is virtual endpoint service software 96 that performs packet processing (transformation) described in more detail below in connection with FIG. 2.

There are numerous such home clouds in a given Internet Service Provider network. To facilitate the communication between home cloud servers, and between home cloud servers and application providers, networking capabilities are presented herein which are not heretofore known.

The techniques presented herein enable micro-cloud instantiation and the ability to build adjacency between the multiple home clouds (Virtual Local Area Network(s), Software Defined Network (SDN) slices etc.) and many application service provider environments. In other words—an Application Centric Infrastructure (ACI) is provided which does not exist today.

Existing data center infrastructure is based on Virtual Extensible Local Area Network (VXLAN) encapsulation and tunneling protocol that is designed for data centers. VXLAN encapsulation increases the scalability of unique segments up to 16 million logical networks. However, given the number of broadband users (290 millions) and smart home users (14 Millions) the VXLAN protocol does not have the scalability to address all the home user networks. Presented herein are methods and functional components that serve as an extension of Application Centric Infrastructure into the Service Provider space with appropriate routing to address the scale and performance requirements of an InterCloud.

Packet encapsulation methods are presented herein that enable building of massive clouds, based on small (residential type, i.e., "home") clouds. These methods involve enhancements to VXLAN, enhancements to label based routing and functional changes to some of the components of the architecture.

Figure 2:
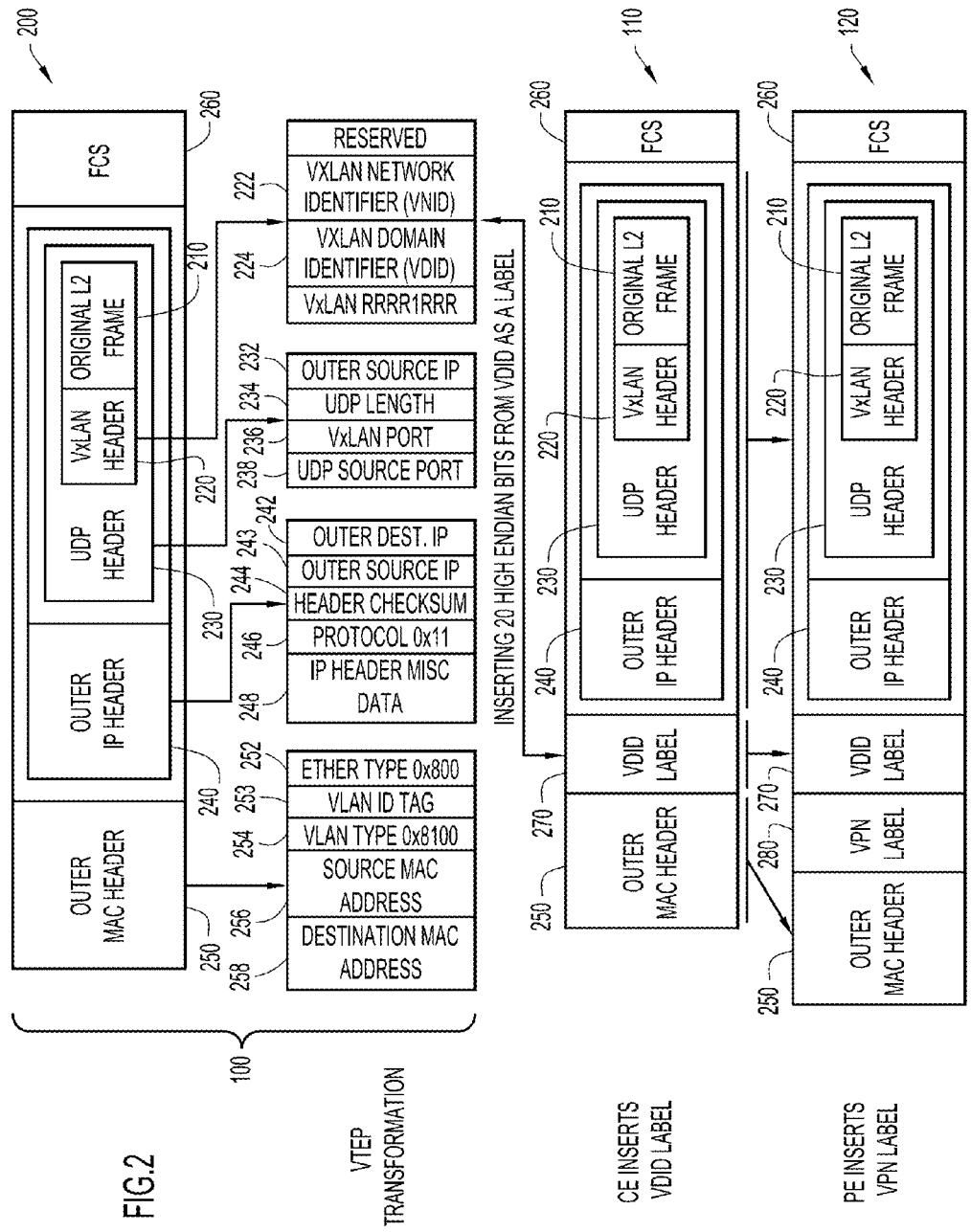
FIG. 2 is a diagram illustrating packet encapsulation and Multiprotocol Label Switching (MPLS) labels appended to an encapsulated packet according to an example embodiment.

Reference is now made to FIG. 2, which depicts the three stages/phases in which packet encapsulations or manipulations are made. The first stage 100 involves VXLAN Tunnel Endpoint (VTEP) transformation 100 performed by the virtual endpoint software running on the home cloud server. The second stage 110 involves the CE device (e.g., home gateway/router) inserting/adding a virtual domain identifier label to the encapsulated packet. The virtual domain identifier label is derived from a virtual domain identifier obtained from the VXLAN header of an encapsulated packet received from virtual endpoint software of a home cloud. The virtual endpoint software is also referred to hereinafter simply as a VTEP. The third stage 120 involves the PE device (e.g., service provider gateway/router) inserting/adding a Virtual Private Network (VPN) label to the encapsulated packet.

FIG. 2 shows an encapsulated packet 200 having a modified VXLAN header to include 24 bytes of a Domain Identifier (ID), called a VDID. More specifically, packet 200 includes an original Layer 2 (L2) Ethernet frame 210 and a VXLAN header 220. The VXLAN header 220 is a modified VXLAN header that includes a 24-bit VXLAN network identifier (VNID) 222 and a 24-bit Domain ID (referred to as VDID) 224. The VXLAN header 220 together with the original Ethernet frame 210 is in a User Datagram Protocol (UDP) payload.

The 24-bit VNID is used to identify a particular one of a plurality of Layer 2 segments and to maintain Layer 2 isolation between the segments. The 24-bit VDID (domain ID) is used to identify a particular one of a plurality of Layer 3 segments (administrative domains) and to maintain Layer 3 isolation between the administrative domains. With all 24 bits in the VDID, the modified VXLAN protocol fields can support 16 million Local Area Network (LAN) administrative domains and each administrative domain supports up to 16 million VLANs (logical networks).

The packet 200 further includes a UDP header 230, an outer IP header 240, an outer Media Access Control (MAC) header 250 and a Frame Check Sequence (FCS) 260. The UDP header includes an outer source IP address 232, UDP length 234, VXLAN port 236 and UDP source port 238. The outer IP header 240 includes an outer destination IP address 242, an outer source IP address 243, a header checksum 244, protocol 0x11 246 and IP header miscellaneous data 248. The outer MAC header 250 includes an Ether Type 252, a VLAN ID tag 253, a VLAN Type 254, a source MAC address 256, and a destination MAC address 258.

The VXLAN modification shown in FIG. 2 is performed by the virtual endpoint service software 69 running on a home cloud server (as shown in FIG. 1), to perform the encapsulation including VDID:VNID=<domain>:<segment> into the original format.

Normally, the VTEP transformation uses IP-based routing, where each router performs an IP lookup ("routing"), determines a next-hop based on its routing table, and forwards the packet to that next-hop. This is repeated for every router, each making its own independent routing decisions, until the final destination is reached. For the purposes of the InterCloud environment described herein that involves a large number of domains and segments, this type of routing will generate an excessive number of lookups.

Accordingly, a label-based routing is used that involves mapping home cloud tenants to modified VXLAN <domains>:<segments>. In one example, the label size is 48 bits (whereas conventional Multiprotocol Label Switching (MPLS) is 20 bits). In addition, an MPLS Virtual Private Network (VPN) label will be included into the transformation as described below.

As shown at reference numeral 110, the CE router/device (e.g., the home gateway/router) receives the packet from a home cloud server (after the VTEP transformation 100 has been made), captures the VDID:VNID information and inserts an MPLS label, called a VDID label, shown at reference numeral 270. The VDID label is comprised of the 20 high endian bits of the VDID contained in the VXLAN header 220. The remaining 4 bits of the VDID may be used for Virtual Point of Presence (VPoP). A VPoP is a point, via which users can connect to an Internet access provider, which is not operated by the provider. The user may be charged by a telephone company for the call to the VPoP which relays his call via a third party circuit to the Internet Service Provider's central location. This is in contrast to a physical point of presence which is operated by the Internet Service Provider.

When the packet reaches the PE router/device (e.g., the service provider gateway/router), the PE router/device inserts a VPN label 280 (e.g., MPLS VPN label) into the packet. Specifically, when a PE router/device receives a packet with a VDID label, it needs to send it over a label-based network, and adds one more label, the VPN label 280. The VDID:VNID label 270 is used to reach the destination CE device and the VPN label 280 is to be used to derive the routing context on the destination PE while the VDID label is used derive the CE context within the VPN context. Another label (not shown in FIG. 2 but the left of VPN label 280) is used to switch the frame to the egress PE device. That label would be swapped at every Provider router along a Label Switched Path (LSP).

The encapsulation and labeling scheme shown in FIG. 2 is a departure from a conventional scheme where a PE device typically adds labels to the packet. This is because, in VXLAN, the sending VTEP already has sufficient information for the destination VTEP (target off of the remote PE device's VPN destination) before the encapsulation takes place. In accordance with the embodiments presented herein, the CE device tags the frame with VXLAN information (specifically, the VDID information which is not heretofore known) and the PE device interprets the VDID information as an attachment circuit (which is also not heretofore known). In other words, a pseudo-wire encapsulation is used where the VDID label is used as the attachment circuit instead of other information, such as Ethernet VLAN or Port.

Figure 3A:
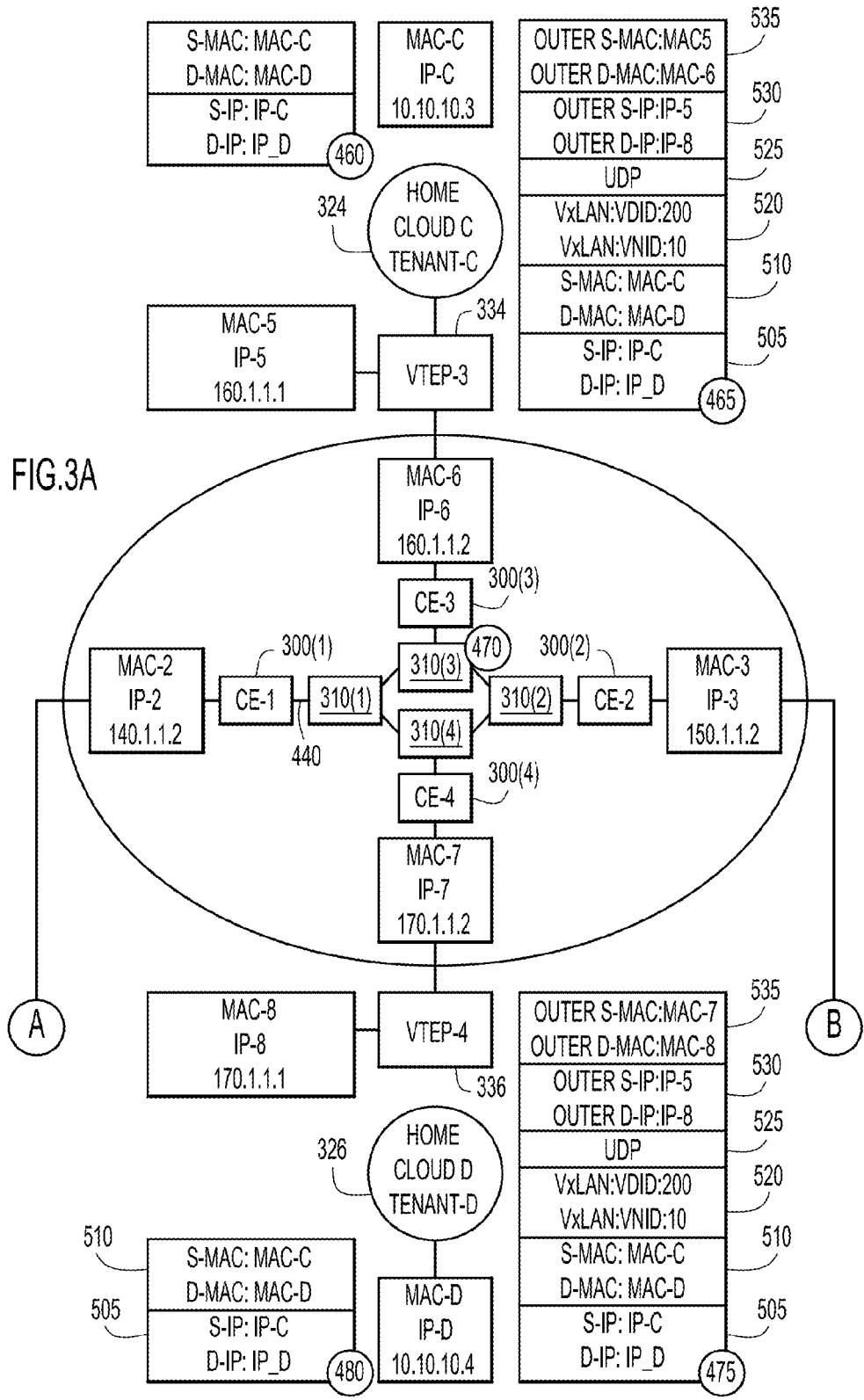
FIGS. 3A and 3B illustrate a first scenario in which connectivity between home clouds is enabled via a service provider network, according to an example embodiment.
Figure 3B:
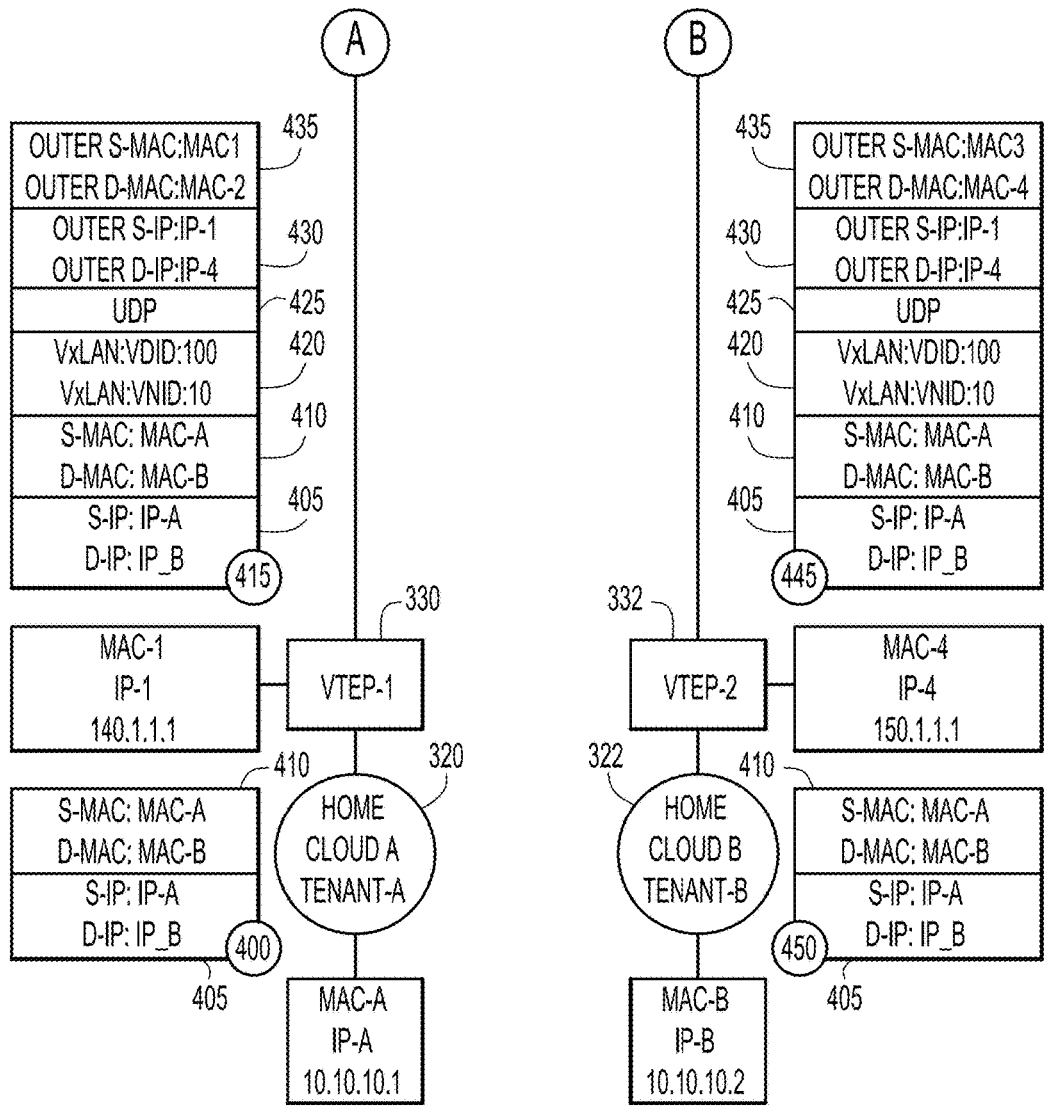

Reference is now made to FIGS. 3A and 3B for a first example application of the encapsulation and labeling scheme of FIG. 2. In this example, there are CE devices 300(1), 300(2), 300(3) and 300(4) (also denoted CE-1, CE-2, CE-3 and CE-4, respectively). There are also PE devices 310(1), 310(2), 310(3) and 310(4). There are four home clouds in this example: Home Cloud A, Home Cloud B, Home Cloud C and Home Cloud D. There are four tenants as well: Tenant A shown at reference numeral 320 in Home Cloud A, Tenant B shown at reference numeral 322 in Home Cloud B, Tenant C shown at 324 in Home Cloud C, and Tenant D at 326 in Home Cloud D. It should be understood that there may be multiple tenants in each home cloud, and this is only an example.

Associated with each (and actually part of) home cloud is a VTEP function that is embodied by software running on a server in that home cloud, as described above in connection with FIG. 1. Specifically, there is a VTEP 330 (also denoted VTEP-1) for Home Cloud A associated with Tenant A, VTEP 332 (also denoted VTEP-2) for Home Cloud B associated with Tenant B, VTEP 334 (also denoted VTEP-3) for Home Cloud C associated with Tenant C and VTEP 336 (also denoted VTEP-4) for Home Cloud D associated with Tenant D. It is noted that there may be multiple VTEPs hanging off a given CE device within a given home cloud.

In FIG. 3, MAC address information, IP address information and VLAN information is provided for the CE devices 300(1)-300(4), the VTEPs 330, 332, 334 and 336 and for Tenants A, B, C and D. For simplicity, this address information is not repeated in this description.

In the example of FIGS. 3A and 3B, Tenant A in Home Cloud A desires to send a packet to a Tenant B in Home Cloud B in a Domain=VDID 100 in Layer 2 network segment for VNID=10, and Tenant C in Home Cloud C desires to send a packet to Tenant D in Home Cloud D in a Domain=VDID 200 in Layer 2 network segment for VNID=10. This example assumes that address learning has already occurred, and corresponding MAC-to-VTEP mappings exist on the VTEPs.

At step 400, Tenant A (MAC-A, IP=10.10.10.1) forms Ethernet frames with address information of Tenant B (MAC-B, IP=10.10.10.2) as the destination MAC address and sends them out to VTEP-1 (MAC-1,IP=140.1.1.1). At this point, the headers of the frames include the inner IP header 405 and inner MAC header 410. The IP header 405 includes the Layer 3 address information for the source (IP-A for Tenant A) and address information for the destination (IP-B for Tenant B). The MAC header 410 includes the Layer 2 (e.g., MAC) address information for the source (MAC-A for Tenant A) and Layer 2 address information for the destination (MAC-B for Tenant B).

At step 415, VTEP-1 (MAC-1,IP=140.1.1.1), with a mapping of MAC-B (MAC-B, IP=10.10.10.2) to VTEP-2 (MAC-1, IP=150.1.1.1) in its mapping table, performs a modified VXLAN encapsulation on the packets by adding VDID:VNID into VXLAN header 420, UDP header 425, outer IP address header 430 and outer MAC header 435, as described above in connection with FIG. 2. In this example, VTEP-1 adds VDID=100 and VNID=10 into the VLXAN header 420, where VDID=100 indicates that Tenant B is in administrative domain 100, and VNID=10 indicates that Tenant B is in logical network/segment 10. In the outer IP address header 430, the source IP address is the IP address of VTEP-1, and the destination IP address is the IP address of VTEP-2. The VTEP-1 sends the packets encapsulated with the VDID:VNID information to the CE device 300(1).

At step 440, CE device 300(1) reads the VXLAN header 420 of the packet to obtain the VDID and takes the 20 high endian bits from the VDID contained in the packet and adds those bits into an MPLS label (called a virtual domain label or VDID MPLS label for simplicity) to the encapsulated packet, as described above in connection with FIG. 2. CE device 300(1) then sends the packet to PE device 310(1).

The PE device 310(1) receives the encapsulated packet having the virtual domain label (e.g., VDID MPLS label) adds the VPN label as described in connection with FIG. 2. The PE-P-PE path will use traditional Label Switch Path routing established (not shown) between the VPN labeled context. The VDID Label indicates the target 'attachment circuit' off of the remote PE's VPN context. This can be thought of as VDID pseudo-wires. A control plane advertises the VDID attachment circuits, using techniques such as Network Layer Reachability Information (NLRI) in the Border Gateway Protocol (BGP). Each router in the provider network repeats the label replacement process until the packet eventually reaches CE device 300(2) (CE-2) (IP=150.1.1.2). CE device 300(2) reads the outer IP header 420 of the packet and determines (D-IP=IP-4) that the packets should be routed to VTEP 332 (VTEP-2) and routes the packet to VTEP 332.

At 445, after VTEP-2 (MAC4, IP=150.1.1.1) receives the packet, it strips off the outer Ethernet, IP, UDP, and VDID:VNID headers, and forwards the packet to Tenant B, based on the original destination MAC address in the Ethernet frame (D-MAC=MAC-B). At 450, Tenant B (MAC-B, IP=10.10.10.2) receives the packet.

The connectivity from Tenant C to Tenant D between VTEP-3 and VTEP-4 routed by CE-3 and CE-4 occurs in the same way as depicted by steps 460, 465, 470, 475 and 480. However in this case VDID:VNID=200:10. FIGS. 3A and 3B show a packet sent from Tenant C to Tenant D. The packet has fields 505, 510, 520, 525, 530, and 535 similar to those shown for the packet Tenant A sends to Tenant B.

Figure 4A:
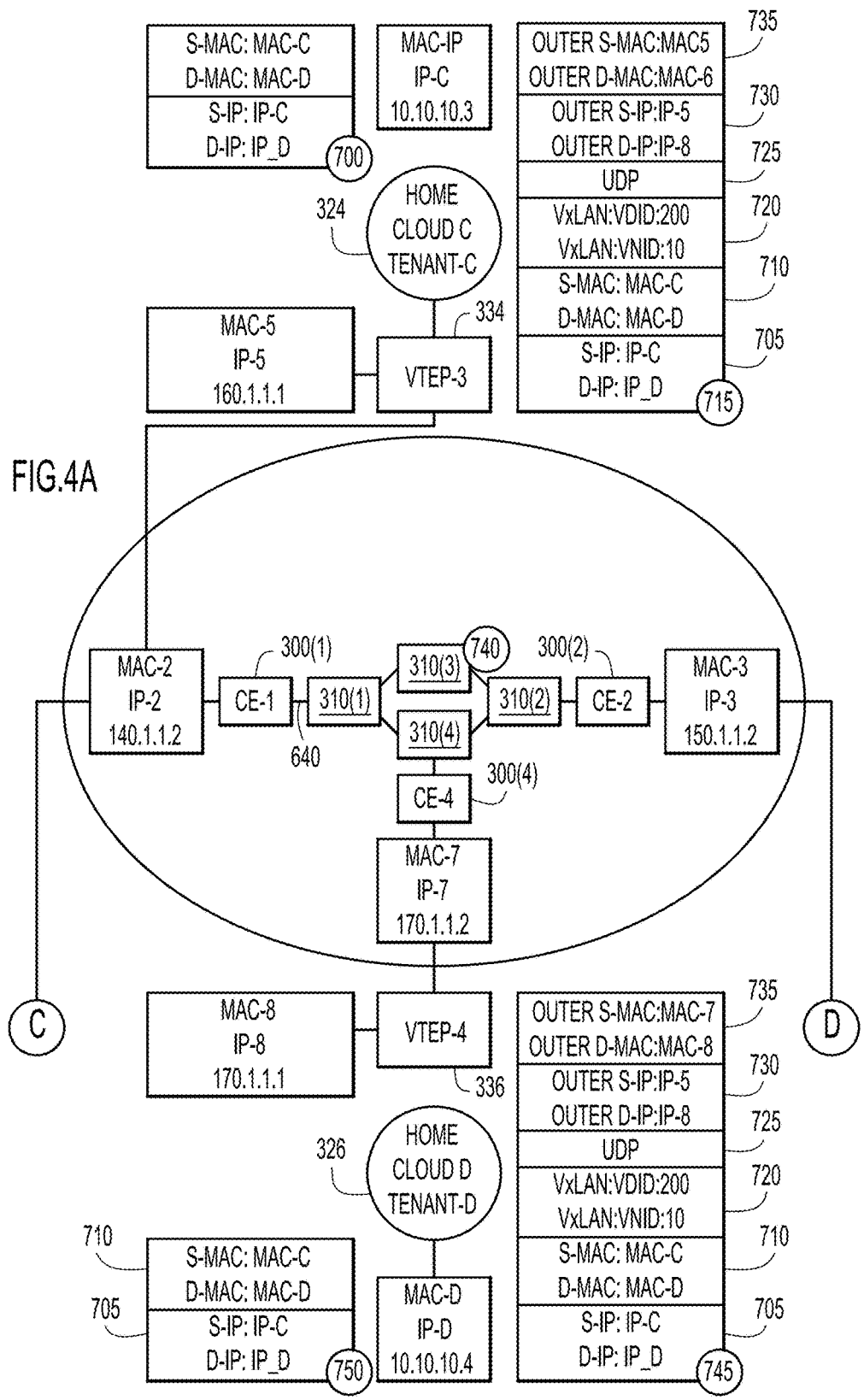
FIGS. 4A and 4B is illustrate a second scenario in which connectivity between home clouds is enabled via a service provider network, according to an example embodiment.
Figure 4B:
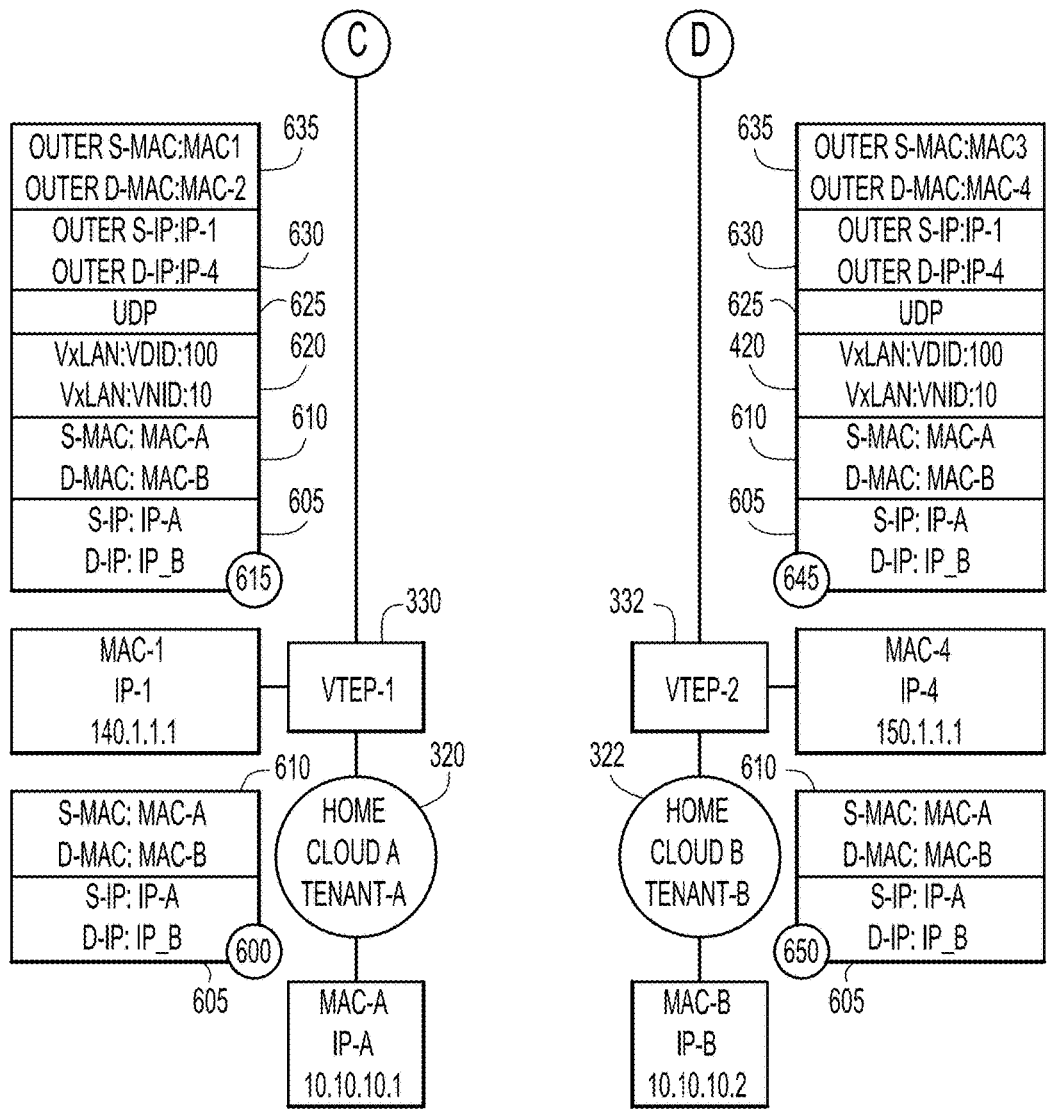

Reference is now made to FIGS. 4A and 4B for another example. In FIGS. 4A and 4B, Tenant A from Home Cloud A and Tenant C from Home Cloud C are routed by the same customer edge device, CE-1. Tenant A connects to Tenant B over VDID=100:VNID=10 and Tenant C connects to Tenant D over VDID=200:VNID=10. The definition of 'data center' is taken somewhat liberally as every home may represent a small data center. Nevertheless, most homes will connect to a provider data center for services offered by the network provider or application service provider. There are some services that will facilitate home-to-home connection of data plane connections while the control plane connections are home-to-data center. These might be video, voice, media transfer, etc.

Specifically, at steps 600, 615, 640, 645 and 650, Tenant A sends a packet to Tenant B. The packet has fields 605, 610, 620, 625, 630 and 635, similar to that described in connection with FIGS. 3A and 3B. Also, Tenant C sends a packet to Tenant D as shown at steps 700, 715, 740, 745 and 750. The packet has fields 605, 610, 620, 625, 630 and 635 similar to that described in connection with FIGS. 3A and 3B. FIGS. 4A and 4B are thus illustrative of a single customer edge device handling the routing for multiple VTEPs, each associated with a different home cloud. The multi-tenant home clouds (Tenants A and C) connected to CE-1 could be configured using separate VLANs, or SDN slices.

Turning now to FIG. 5, a flow chart is shown that depicts operations for a method 800 performed by a first computing apparatus (e.g., server) in a first home cloud. A packet is sourced by a first service running on the first computing apparatus to be sent to a second service running on a second computing apparatus in a second home cloud. The first service is the service that is being shared into the Internet Service Provider or Application Service Provider network as part of the InterCloud. The packet includes headers that comprise source address information for the first service and destination address information for the second service. At 810, a first virtual endpoint service (e.g., VTEP) running on the first computing apparatus generates an encapsulated packet that appends to the packet, outer headers which comprise Layer 2 source address information for the first virtual endpoint service running on the first computing apparatus, Layer 2 destination address information for a first customer edge network device, Layer 3 source address information for the first virtual endpoint service, Layer 3 destination address information for a second virtual endpoint service running on the second computing apparatus, a virtual network identifier that identifies one of a plurality of Layer 2 network segments in which the second home cloud resides and a virtual domain identifier that identifies one of a plurality of Layer 3 network segments in which the second home cloud resides. At 820, the first virtual endpoint service sends the packet to the first customer edge network device.

Reference is now made to FIG. 6, which illustrates a flow chart for operations of a method 900 performed at a customer edge network device. At 910, a first customer edge network device receives an encapsulated packet that includes inner headers comprising source address information for a first service running on a first computing apparatus in a first home cloud and destination address information for a second service running on a second computing apparatus in a second home cloud. The encapsulated packet further includes outer headers which comprise Layer 2 source address information for a first virtual endpoint service running on the first computing apparatus, Layer 2 destination address information for the first customer edge network device, Layer 3 source address information for the first virtual endpoint service, Layer 3 destination address information for a second virtual endpoint service running on the second computing apparatus, a virtual network identifier that identifies one of a plurality of Layer 2 network segments in which the second home cloud resides and a virtual domain identifier that identifies one of a plurality of Layer 3 network segments in which the second home cloud resides. At 920, a predetermined portion of bits (e.g., 20 out of the 24 bits) of the virtual domain identifier of the encapsulated packet is inserted into a label or tag for label-based or tag-based routing, such as a Multiprotocol Label Switching (MPLS) label to form a virtual domain label. At 930, the virtual domain label is appended to the encapsulated packet. At 940, the encapsulated packet with the virtual domain label is sent to a first provider edge network device of a provider network.

Reference is now made to FIG. 7. FIG. 7 shows a flow chart for operations of a method 1000 performed at a first provider edge network device that receives a packet from a first customer edge network device. At 1010, the first provider edge network device receives an encapsulated packet from a first customer edge network device. The encapsulated packet includes inner headers comprising source address information for a first service running on a first computing apparatus in a first home cloud and destination address information for a second service running on a second computing apparatus in a second home cloud. The encapsulated packet further includes outer headers which comprise Layer 2 source address information for a first virtual endpoint service running on the first computing apparatus, Layer 2 destination address information for the first customer edge network device, Layer 3 source address information for the first virtual endpoint service, Layer 3 destination address information for a second virtual endpoint service running on the second computing apparatus, a virtual network identifier that identifies one of a plurality of Layer 2 network segments in which the second home cloud resides and a virtual domain identifier that identifies one of a plurality of Layer 3 network segments in which the second home cloud resides, and a virtual domain label (e.g., MPLS label) appended to the encapsulated packet that comprises a predetermined portion of bits of the virtual domain identifier. At 1020, an virtual private network label is appended to the encapsulated packet. At 1030, the first provider edge network device sends the encapsulated packet with the virtual domain label and the virtual private network label to a provider network device for label-based (tag-based) routing in the provider network.

Figure 8:
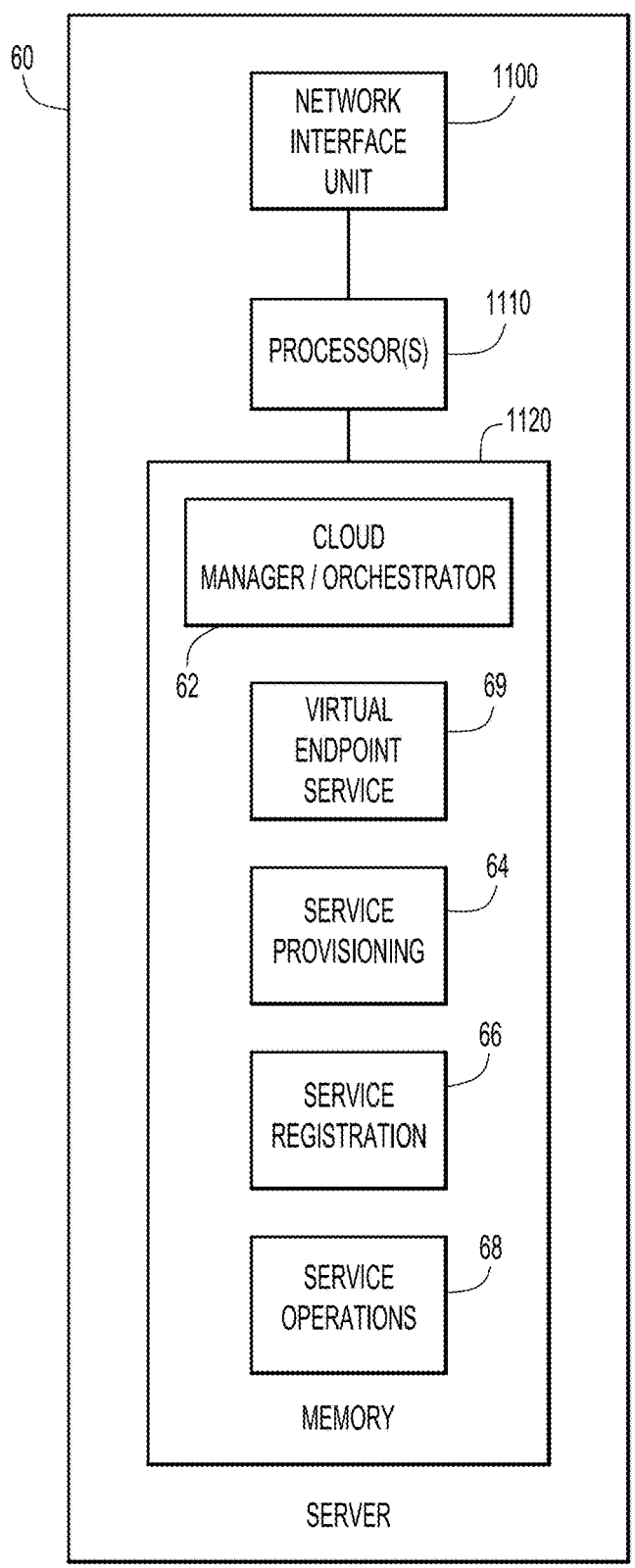
FIG. 8 is a block diagram of a home cloud server, according to an example embodiment.

FIG. 8 is a block diagram of the server 60 that is present in a home cloud, and on which the aforementioned virtual endpoint service 69 (i.e., VTEP) runs as well as the service that is to be shared into the InterCloud. The server 60 is a computing apparatus that includes a processor 1100 (or multiple processors), a network interface unit 1110 and a memory 1120. The processor 1100 may be a microprocessor or microcontroller. The network interface unit 1110 is a network interface card (or multiple network interface cards) that enable network communications on behalf of the server 60. The memory 1120 stores instructions that are executed by the processor 1100. For example, the memory 1120 stores instructions for the cloud manager/orchestrator 62, service provisioning 64, service registration 66, service operations 68 and virtual endpoint service 69.

The memory 1120 may include read only memory (ROM), random access memory (RAM), magnetic disk storage media devices, optical storage media devices, flash memory devices, electrical, optical, or other physical/tangible memory storage devices. Thus, in general, the memory 1120 may include one or more tangible (non-transitory) computer readable storage media (e.g., a memory device) encoded with software comprising computer executable instructions and when the software is executed (by the processor 1100) it is operable to perform the operations described herein, and in the operations described with reference to FIGS. 1 and 3A, 3B, 4A, 4B and 5 for a VTEP running in a home cloud.

Figure 9:
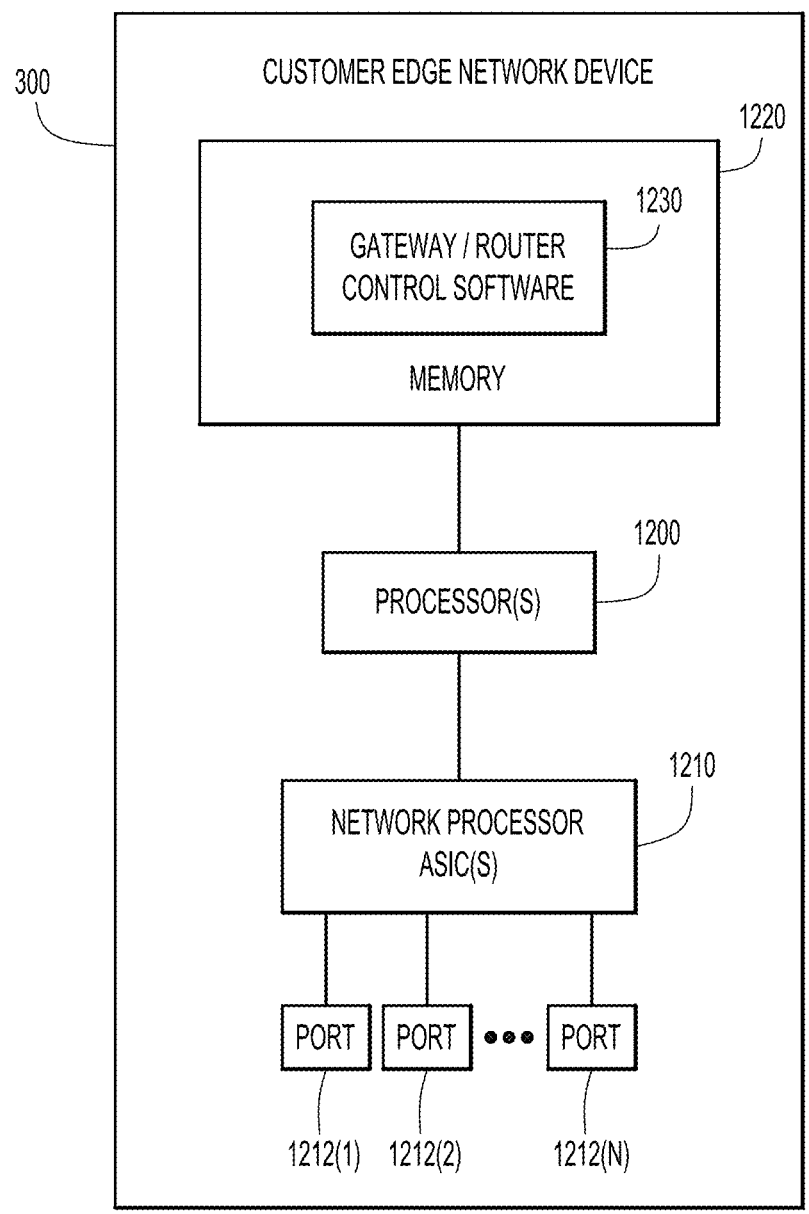
FIG. 9 is a block diagram of a customer edge network device, according to an example embodiment.

Turning to FIG. 9, a block diagram is shown for a customer edge network device, generically identified by reference numeral 300, but is representative of any of the customer edge network devices shown in FIGS. 1, 3 and 4.

The customer edge network device 300 may be a home gateway or router that includes a processor 1200 (or multiple processors), a network processor Application Specific Integrated Circuit (ASIC) (or multiple ASICs) 1210, a plurality of network ports 1212(1)-1212(N) and memory 1220. The network processor ASIC 1210 performs a variety of network routing functions and perhaps switching functions, and communicates with a provider edge network device in an Internet Service Provider network. The memory 1220 stores software instructions for gateway/router control software 1230. The processor executes the gateway/router control software 1230 to perform the packet processing and routing functions described above in connection with FIGS. 1, 2, 3A, 3B, 4A, 4B and 6.

Figure 10:
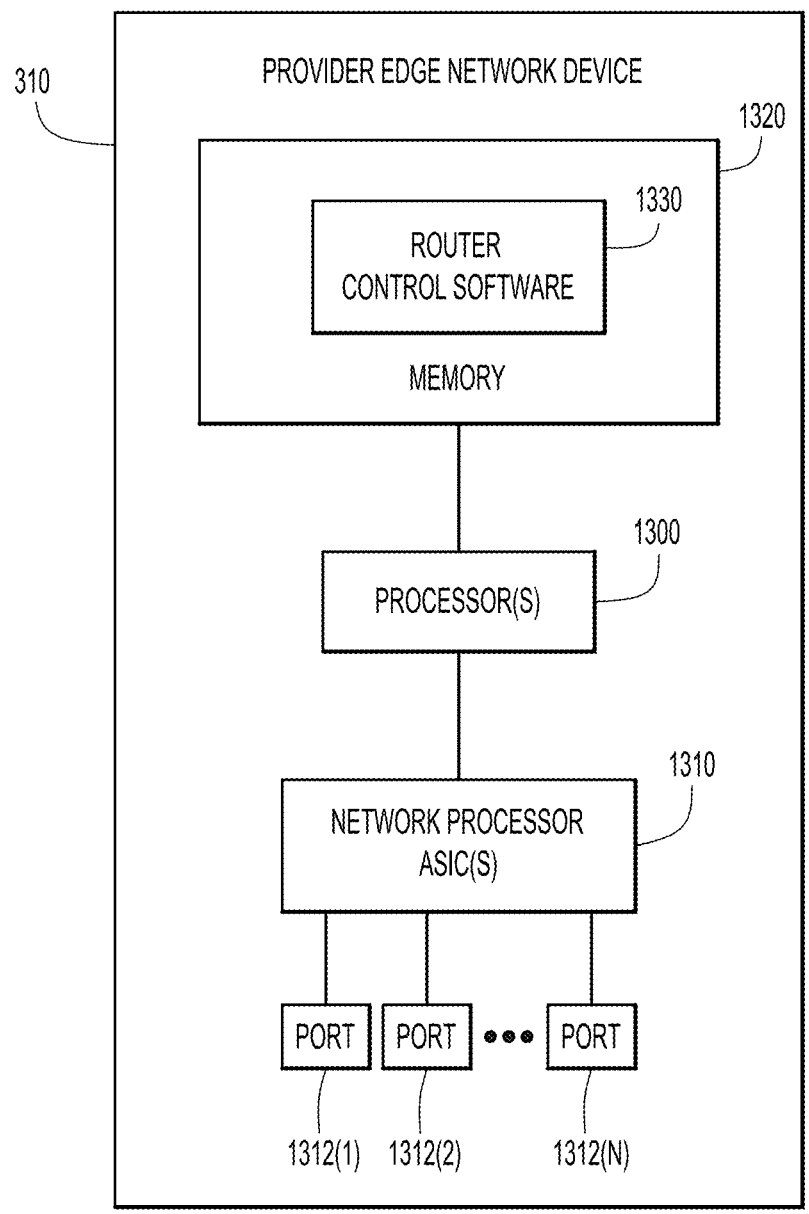
FIG. 10 is a block diagram of a provider edge network device, according to an example embodiment.

Turning to FIG. 10, a block diagram is shown for a provider edge network device, generically identified by reference numeral 310, but is representative of any of the customer edge network devices shown in FIGS. 1, 3A, 3B and 4A, and 4B. The provider edge network device 300 may be a router that includes a processor 1300 (or multiple processors), a network processor ASIC (or multiple ASICs) 1310, a plurality of network ports 1312(1)-1312(N) and memory 1320. The network processor ASIC 1310 performs a variety of network routing functions and perhaps switching functions, and communicates with provider network devices in an Internet Service Provider network. The memory 1320 stores software instructions for router control software 1330. The processor executes the gateway/router control software 1330 to perform the packet processing and routing functions described above in connection with FIGS. 1, 2, 3A, 3B, 4A, 4B and 7.

In summary, the methods and protocol changes presented herein allow large scale InterCloud solutions to enable service providers to take advantage of a vast number of home clouds. The expected scope of an InterCloud deployment, if used with conventional IP routing (typically used with VXLAN), could generate an excessive number of lookups which could negatively impact performance. No methods and protocols are heretofore known that build large scale clouds based on residential and personal clouds.

The methods presented herein involve providing modified versions of VXLAN, by introducing the concept of the VXLAN additional 24 bits domain identifier. This protocol change enables the reach of 2^<domain>*2^<segment> number of VLANs, achieving a Service Provider level of scale for a switching fabric. A modified label-based tagging is provided that changes the label size and content (routing based on VDID:VNID). The roles of the VTEP, CE network device, and PE network device are changed. The CE device tags the frame with VXLAN information and the PE device interprets the 20 most significant bits of the VDID (presented as a label) information as an attachment circuit.

These techniques allow an Application Centric Infrastructure (ACI) for the Data Center and Enterprise Network to be extended to the Service Provider. The methods, apparatus and protocol changes presented herein enable a Service Provider to build a large scale (Service Provider/Application Provider scale and performance) InterCloud architecture taking advantage of residential clouds, and specifically the excess of the bandwidth, compute, storage and power of residential networks.

In one form, a method is provided comprising: receiving at a first customer edge network device, an encapsulated packet that includes inner headers comprising source address information for a first service running on a first computing apparatus in a first home cloud and destination address information for a second service running on a second computing apparatus in a second home cloud, the encapsulated packet further including outer headers which comprise Layer 2 source address information for a first virtual endpoint service running on the first computing apparatus, Layer 2 destination address information for the first customer edge network device, Layer 3 source address information for the first virtual endpoint service, Layer 3 destination address information for a second virtual endpoint service running on the second computing apparatus, a virtual network identifier that identifies one of a plurality of Layer 2 network segments in which the second home cloud resides and a virtual domain identifier that identifies one of a plurality of Layer 3 network segments in which the second home cloud resides; inserting a predetermined portion of bits of the virtual domain identifier of the encapsulated packet into a label to form a virtual domain label for label-based routing; appending the virtual domain label to the encapsulated packet; and sending the encapsulated packet with the virtual domain label to a first provider edge network device of a provider network.

In another form, a method is provided comprising: at a first computing apparatus in a first home cloud: for a packet sourced by a first service running on the first computing apparatus to be sent to a second service running on a second computing apparatus in a second home cloud and the packet including headers that comprise source address information for the first service and destination address information for the second service, a first virtual endpoint service running on the first computing apparatus generating an encapsulated packet that appends to the packet outer headers which comprise Layer 2 source address information for the first virtual endpoint service, Layer 2 destination address information for a first customer edge network device, Layer 3 source address information for the first virtual endpoint service, Layer 3 destination address information for a second virtual endpoint service running on the second computing apparatus, a virtual network identifier that identifies one of a plurality of Layer 2 network segments in which the second home cloud resides and a virtual domain identifier that identifies one of a plurality of Layer 3 network segments in which the second home cloud resides; and sending the encapsulated packet to the first customer edge network device; at the first customer edge network device: receiving the encapsulated packet; inserting a predetermined portion of bits of the virtual domain identifier of the encapsulated packet into a label to form a virtual domain label for label-based routing; appending the virtual domain label to the encapsulated packet; and sending the encapsulated packet with the virtual domain label to a first provider edge network device of a provider network; at the first provider edge network device: receiving the encapsulated packet with the virtual domain label; appending an virtual private network label to the encapsulated packet; and sending the encapsulated packet with the virtual domain label and the virtual private network label from the first provider edge network device to a provider network device for routing in the provider network.

In still another form, an apparatus is provided comprising: a plurality of network ports configured to receive packets from and send packets to a network; a network processor unit coupled to the plurality of network ports and configured to direct received packets to one or more of the network ports; and a processor configured to: receive via one of the plurality network ports, an encapsulated packet that includes inner headers comprising source address information for a first service running on a first computing apparatus in a first home cloud and destination address information for a second service running on a second computing apparatus in a second home cloud, the encapsulated packet further including outer headers which comprise Layer 2 source address information for a first virtual endpoint service running on the first computing apparatus, Layer 2 destination address information for a first customer edge network device, Layer 3 source address information for the first virtual endpoint service, Layer 3 destination address information for a second virtual endpoint service running on the second computing apparatus, a virtual network identifier that identifies one of a plurality of Layer 2 network segments in which the second home cloud resides and a virtual domain identifier that identifies one of a plurality of Layer 3 network segments in which the second home cloud resides; insert a predetermined portion of bits of the virtual domain identifier of the encapsulated packet into a label to form a virtual domain label for label-based routing; append the virtual domain label to the encapsulated packet; and cause the encapsulated packet with the virtual domain label to be sent via one of the plurality of network ports to a first provider edge network device of a provider network.

The above description is intended by way of example only. Various modifications and structural changes may be made therein without departing from the scope of the concepts described herein and within the scope and range of equivalents of the claims.

What is claimed is:

1. A method comprising:
   receiving at a first customer edge network device, an encapsulated packet that includes inner headers comprising source address information for a first service running on a first computing apparatus in a first home cloud and destination address information for a second service running on a second computing apparatus in a second home cloud, the encapsulated packet further including outer headers which comprise Layer 2 source address information for a first virtual endpoint service running on the first computing apparatus, Layer 2 destination address information for the first customer edge network device, Layer 3 source address information for the first virtual endpoint service, Layer 3 destination address information for a second virtual endpoint service running on the second computing apparatus, a virtual network identifier that identifies one of a plurality of Layer 2 network segments in which the second home cloud resides and a virtual domain identifier that identifies one of a plurality of Layer 3 network segments in which the second home cloud resides;
   inserting a predetermined portion of bits of the virtual domain identifier of the encapsulated packet into a label to form a virtual domain label for label-based routing;
   appending the virtual domain label to the encapsulated packet; and
   sending the encapsulated packet with the virtual domain label to a first provider edge network device of a provider network.

2. The method of claim 1, wherein the predetermined portion of bits comprises a predetermined number of high endian bits of the virtual domain identifier.

3. The method of claim 2, wherein the virtual domain identifier comprises 24 bits and the predetermined number of high endian bits comprises 20 bits.

4. The method of claim 2, wherein remaining bits of the virtual domain identifier are used for virtual Point-of-Presence.

5. The method of claim 1, wherein the virtual network identifier and virtual domain identifier are in a Virtual Extensible Local Area Network (VXLAN) header of a Layer 2 frame.

6. The method of claim 5, wherein the VXLAN header and the Layer 2 frame are encapsulated in a User Datagram Protocol (UDP) payload.

7. A method comprising:
   at a first computing apparatus in a first home cloud:
      for a packet sourced by a first service running on the first computing apparatus to be sent to a second service running on a second computing apparatus in a second home cloud and the packet including headers that comprise source address information for the first service and destination address information for the second service, a first virtual endpoint service running on the first computing apparatus generating an encapsulated packet that appends to the packet outer headers which comprise Layer 2 source address information for the first virtual endpoint service, Layer 2 destination address information for a first customer edge network device, Layer 3 source address information for the first virtual endpoint service, Layer 3 destination address information for a second virtual endpoint service running on the second computing apparatus, a virtual network identifier that identifies one of a plurality of Layer 2 network segments in which the second home cloud resides and a virtual domain identifier that identifies one of a plurality of Layer 3 network segments in which the second home cloud resides; and
      sending the encapsulated packet to the first customer edge network device;
   at the first customer edge network device:
      receiving the encapsulated packet;
      inserting a predetermined portion of bits of the virtual domain identifier of the encapsulated packet into a label to form a virtual domain label for label-based routing;
      appending the virtual domain label to the encapsulated packet; and
      sending the encapsulated packet with the virtual domain label to a first provider edge network device of a provider network;
   at the first provider edge network device:
      receiving the encapsulated packet with the virtual domain label;
      appending an virtual private network label to the encapsulated packet; and
      sending the encapsulated packet with the virtual domain label and the virtual private network label from the first provider edge network device to a provider network device for routing in the provider network.

8. The method of claim 7, further comprising, at a second customer edge network device:
   receiving the encapsulated packet from a second provider edge network device in the provider network;
   obtaining from the outer headers of the encapsulated packet address information indicating that the encapsulated packet is to be routed to the second virtual endpoint service running on the second computing apparatus in the second home cloud; and
   routing the encapsulated packet to the second virtual endpoint service running on the second computing apparatus in the second home cloud.

9. The method of claim 8, further comprising, at the second computing apparatus:
   receiving the encapsulated packet; and
   the second virtual endpoint service removing the outer headers, the virtual domain identifier and the virtual network identifier, and determining that the destination of the packet is the second service; and
   forwarding the packet to the second service running on the second computing apparatus.

10. The method of claim 7, wherein generating the encapsulated packet comprises inserting the virtual network identifier and virtual domain identifier in a Virtual Extensible Local Area Network (VXLAN) header to a Layer 2 frame.

11. The method of claim 7, wherein the VXLAN header and the Layer 2 frame are encapsulated in a User Datagram Protocol (UDP) payload.

12. The method of claim 7, wherein the predetermined portion of bits comprises a predetermined number of high endian bits of the virtual domain identifier.

13. The method of claim 12, wherein the virtual domain identifier comprises 24 bits and the predetermined number of high endian bits comprises 20 bits.

14. The method of claim 12, wherein remaining bits of the virtual domain identifier are used for virtual Point-of-Presence.

15. An apparatus comprising:
   a plurality of network ports configured to receive packets from and send packets to a network;
   a network processor unit coupled to the plurality of network ports and configured to direct received packets to one or more of the network ports; and
   a processor configured to:
      receive via one of the plurality network ports, an encapsulated packet that includes inner headers comprising source address information for a first service running on a first computing apparatus in a first home cloud and destination address information for a second service running on a second computing apparatus in a second home cloud, the encapsulated packet further including outer headers which comprise Layer 2 source address information for a first virtual endpoint service running on the first computing apparatus, Layer 2 destination address information for a first customer edge network device, Layer 3 source address information for the first virtual endpoint service, Layer 3 destination address information for a second virtual endpoint service running on the second computing apparatus, a virtual network identifier that identifies one of a plurality of Layer 2 network segments in which the second home cloud resides and a virtual domain identifier that identifies one of a plurality of Layer 3 network segments in which the second home cloud resides;
      insert a predetermined portion of bits of the virtual domain identifier of the encapsulated packet into a label to form a virtual domain label for label-based routing;
      append the virtual domain label to the encapsulated packet; and
      cause the encapsulated packet with the virtual domain label to be sent via one of the plurality of network ports to a first provider edge network device of a provider network.

16. The apparatus of claim 15, wherein the predetermined portion of bits comprises a predetermined number of high endian bits of the virtual domain identifier.

17. The apparatus of claim 16, wherein the virtual domain identifier comprises 24 bits and the predetermined number of high endian bits comprise 20 bits.

18. The apparatus of claim 16, wherein remaining bits of the virtual domain identifier are used for virtual Point-of-Presence.

19. The apparatus of claim 15, wherein the virtual network identifier and virtual domain identifier are in a Virtual Extensible Local Area Network (VXLAN) header of a Layer 2 frame.

20. The apparatus of claim 19, wherein the VXLAN header and the Layer 2 frame are encapsulated in a User Datagram Protocol (UDP) payload.

* * * * *